United States Patent [19]

Zalesak

[11] Patent Number: 4,702,638
[45] Date of Patent: Oct. 27, 1987

[54] INEXPENSIVE, KNOCK-DOWN FURNITURE ASSEMBLED WITH MATING, MOLDED, PLASTIC SHELLS FOR CORNERS AND ELBOWS

[75] Inventor: Jon Zalesak, Hortonville, Wis.

[73] Assignee: American Toy & Furniture Co., Inc., Chicago, Ill.

[21] Appl. No.: 928,858

[22] Filed: Nov. 10, 1986

[51] Int. Cl.$^4$ .............................................. B25G 3/36
[52] U.S. Cl. .................................... 403/403; 403/205; 403/401; 403/382; 403/172; 312/140
[58] Field of Search ............... 403/231, 403, 205, 382, 403/401, 402, 172; 312/140, 257 SK, 257 A; 108/153; 446/482

[56] References Cited

U.S. PATENT DOCUMENTS

| | | | |
|---|---|---|---|
| 3,042,158 | 7/1962 | Michaels | 403/403 X |
| 4,011,706 | 3/1977 | Dupree | 403/231 |
| 4,106,476 | 8/1978 | Harsha | 403/231 X |
| 4,621,879 | 11/1986 | Schneider | 312/140 X |

Primary Examiner—Andrew V. Kundrat
Attorney, Agent, or Firm—Norman Lettvin

[57] ABSTRACT

Inexpensive, knock-down, furniture constructions, assembled with mating, molded, plastic shells for corners and elbows are disclosed for use in furniture pieces for use by children. The furniture constructions include panel members of inexpensive sheet material. Each corner connector is formed of two mating shells, that are each molded of plastic and which are shaped to provide internally thereof pairs of telescoping pins and sleeves, which frictionally hold the shells assembled after the pair of shells are pressed together. Each corner connector provides at least two socket means, each for receiving a wooden rail with a channel along its length. The panel members are positioned in and held by the channels of a pair of rails. A pin or sleeve provided on at least one of the corner connectors extends through an aperture provided in each panel member, to effect a holding of the panel member in its proper intended position relative to the plastic mating shells and to the channeled rails.

6 Claims, 10 Drawing Figures

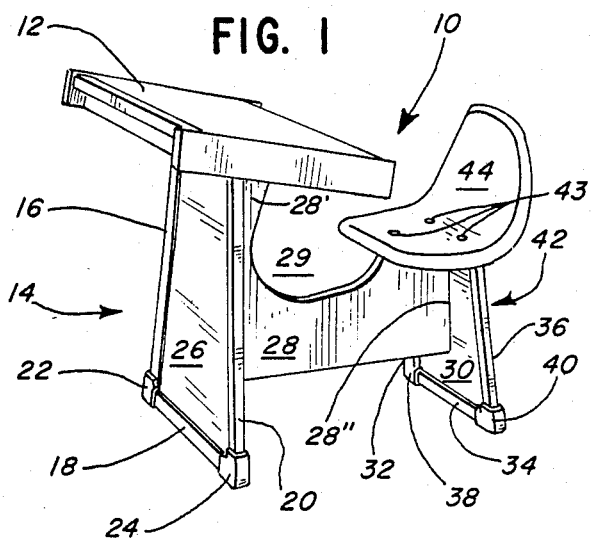
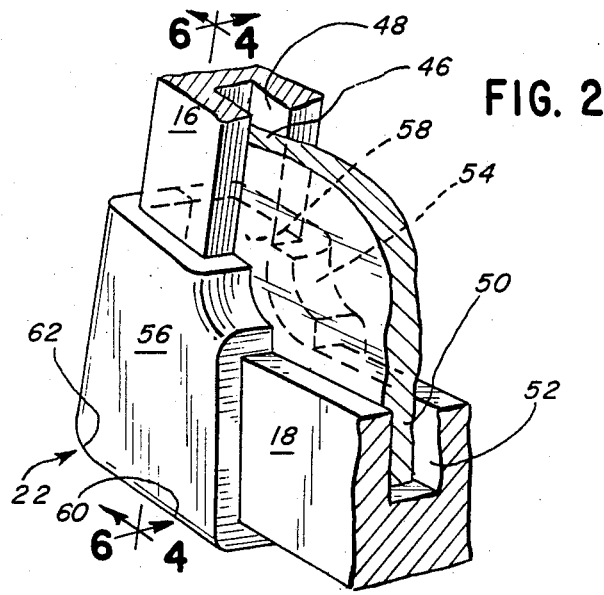
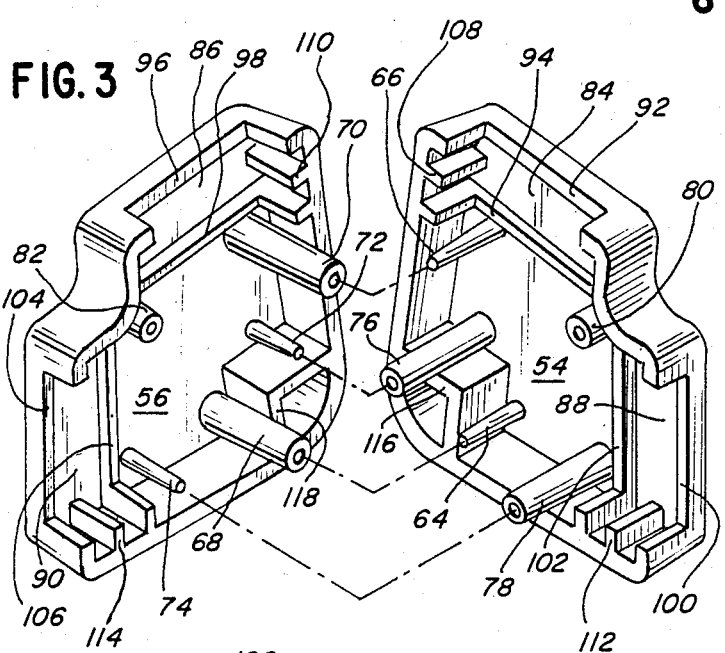
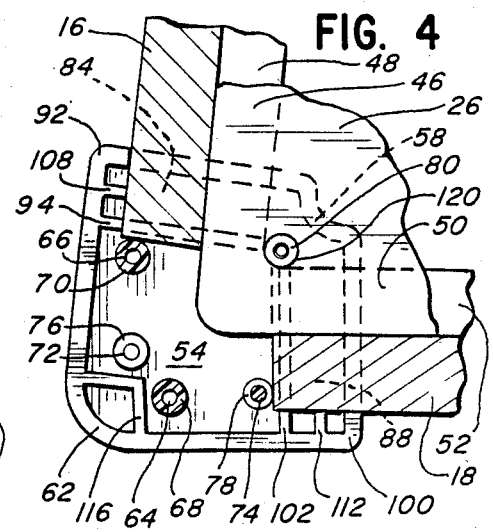
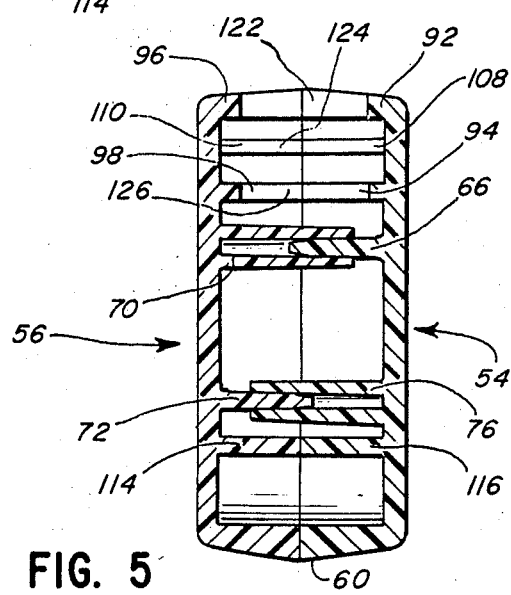
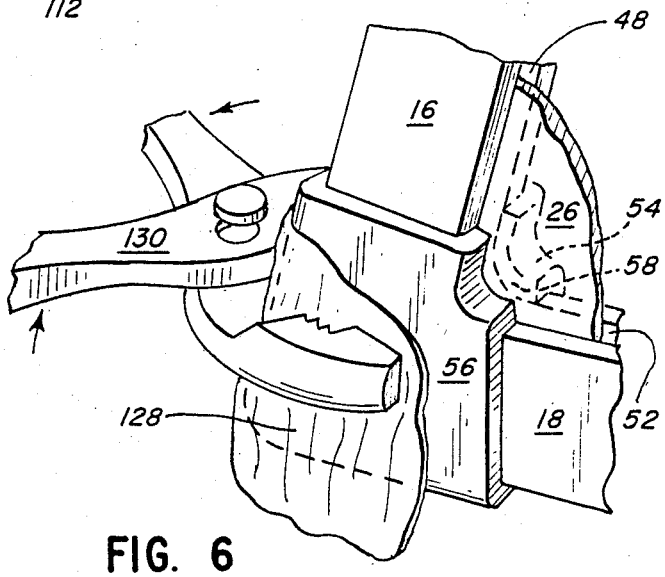

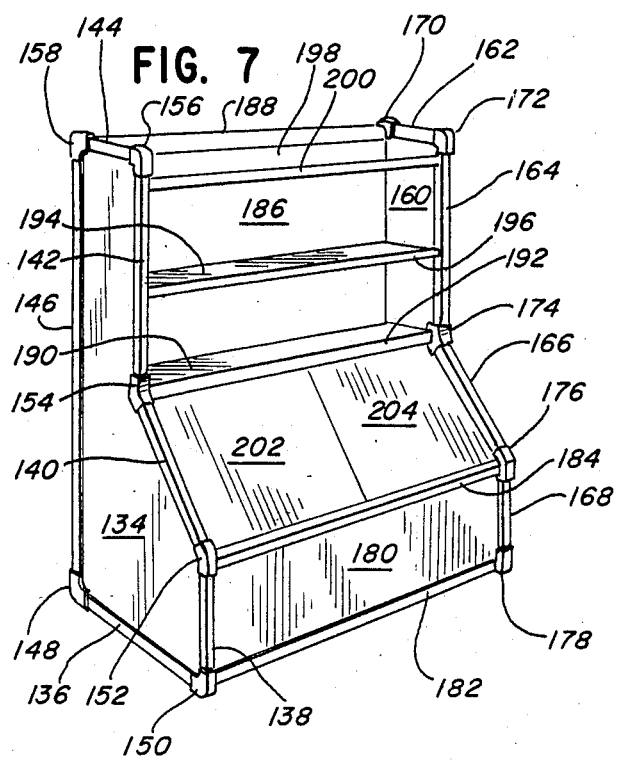
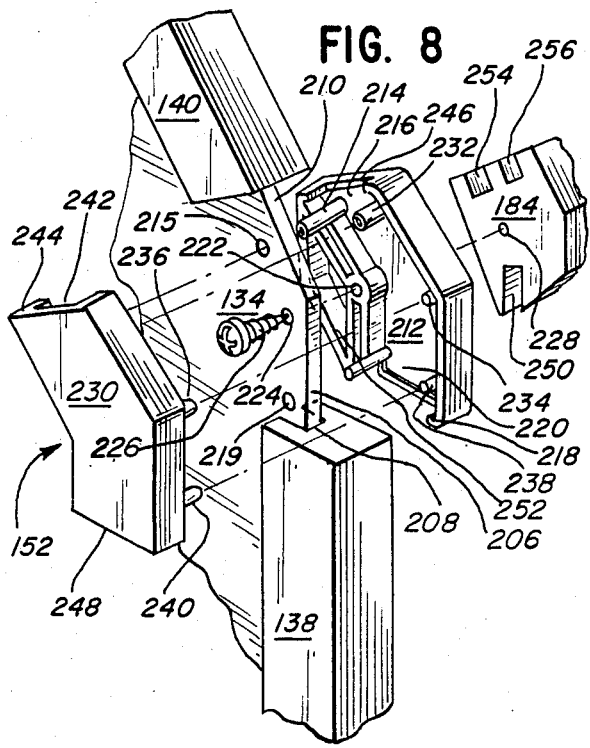
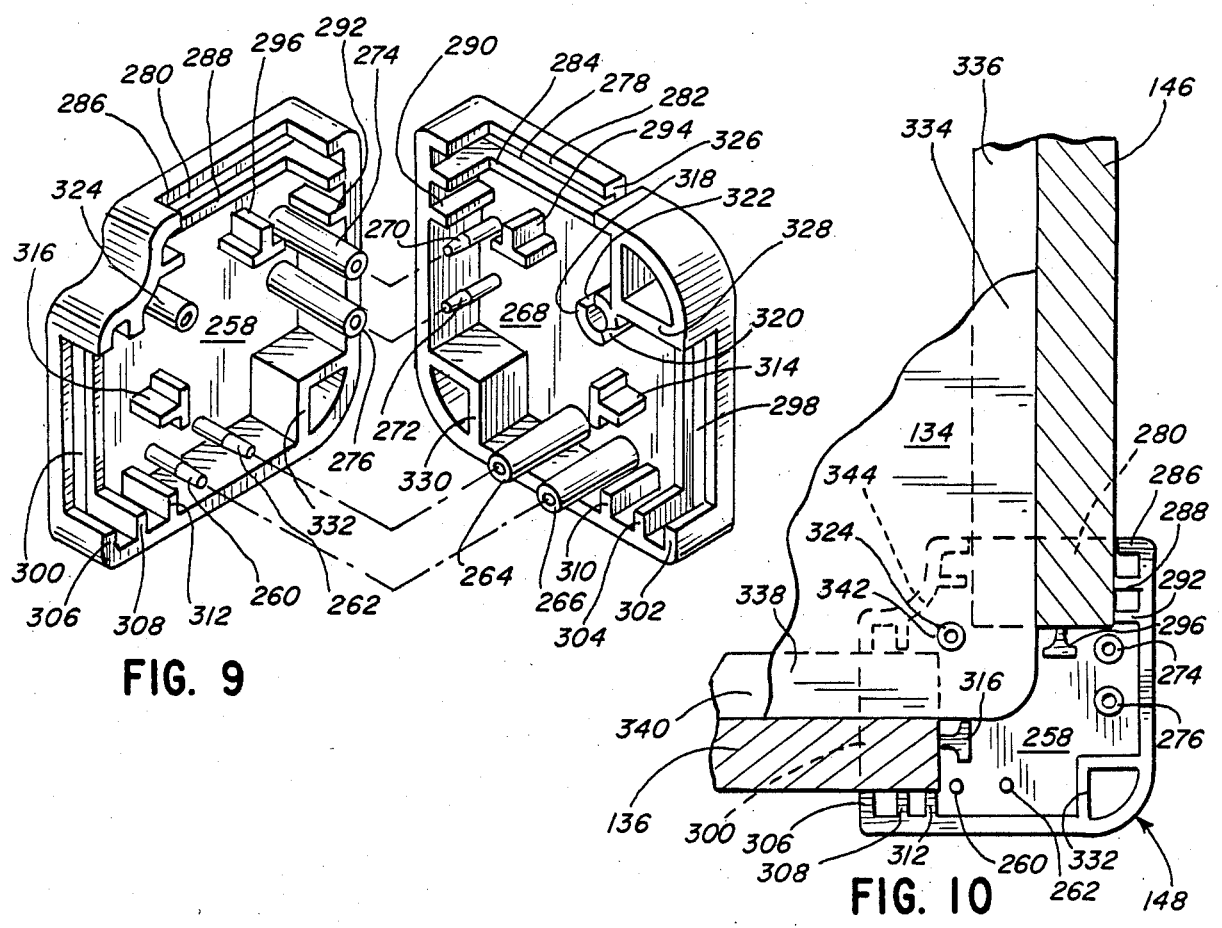

INEXPENSIVE, KNOCK-DOWN FURNITURE ASSEMBLED WITH MATING, MOLDED, PLASTIC SHELLS FOR CORNERS AND ELBOWS

FIELD OF THE INVENTION

This invention relates to inexpensive, knock-down furniture and to molded corner and elbow shell connectors for the assembly of such furniture.

BACKGROUND OF THE INVENTION

Furniture made for children is usually modeled after adult furniture but constructed on a smaller scale. Thus, in furniture for children, the framing might not be as heavy or as reinforced, or panels may not be as thick as those used in adult furniture. In general, the materials used for children's furniture are not as strong and are therefore, less expensive. Although furniture for children need not have the strength capacity of ordinary furniture, furniture for children does need to be made safe. Also, children's furniture tends to get dragged around, and some type of floor guard is preferable and-/or necessary.

In the instant invention, novel connectors, in the form of a pair of molded, plastic shells are used: to fabricate the furniture; to protect floors by limiting the need for nail or screw fasteners; to cap, or shield normally sharp corners; and to provide socket-like receptors for channeled rails and panels, provided as parts of the furniture piece.

The connectors make easier a task that has traditionally intrigued parents, that of assembling their children's furniture. The furniture is inexpensively provided in knocked-down condition, thereby reducing shipping charges. The connectors also accomplish their intended purpose in an inexpensive and novel manner, and increase the attractiveness of the assembled furniture.

BRIEF DESCRIPTION OF THE INVENTION

The plastic shell connectors that are an integral part of the invention disclosed herein have a number of attractive and useful features. Each connector is shaped to provide a pair of socket-like receptors for receving the ends of two frame or rail members, preferably made of wood. Each rail member is channeled along its length to receive thereinto an elongated edge of a panel member. Each panel member may be attractively painted or decorated.

Each corner connector is formed of two facing, mating shells which are molded to provide pairs of aligned studs which, when the shells are assembled together, provide an attachment member that cooperates with an aperture provided through the panel member. The attachment member will extend through the aperture to provide for assembly and alignment of the panel member onto the corner connector. Other elements on the connectors provide a stop means against which an end of each of the two rail members abut to limit the projection of the rail member into the corner connector.

In order to provide a smooth corner for the assembled shells, the portion of the connector that does not provide sockets for receiving the ends of rail members is shaped to provide an exterior rounded corner. In order to effect assemblage of the two facing shells, the interior of the connector includes spaced, elongated, tapered pins that are aligned with spaced tubular sleeve parts that are each positioned to frictionally receive thereinto one of the elongated tapered pins. Each shell is preferably provided with one pair of tapered pins and one pair of tubular sleeves, and the pins-and-sleeves are so positioned that each pin will enter or telescope into a tubular sleeve provided on the complementary shell. This arrangement provides a group of four combination pins-and-sleeves which when aligned and pressed together, operate to frictionally hold the two shells assembled to each other without the need of separate fasteners.

Each connector is also provided with ribbing that reinforces the shells. The ribbing is located on the walls of the sockets that receive the ends of the rail members, and serves to help align the end of each rail within its socket. When a pair of shells are secured together, the ribs also grip the rail members in order to prevent twisting of the member relative to its socket and to limit axial movement of the rail member along its longitudinal axis. Ribs are also provided internally at the shells' rounded corners to provide for reinforcement of the corner.

BRIEF DESCRIPTION OF THE DRAWINGS

The benefits of the construction herein disclosed will become apparent to one skilled in the art from the following detailed description of a few preferred forms of construction, having reference to the accompanying drawings wherein:

FIG. 1 is a perspective view of a child's combination desk and seat, having spaced front and rear supports for the desk member and seat member, and with the front and rear supports being constructed to utilize the improved corner connectors;

FIG. 2 is an enlarged, fragmentary, perspective view of one of the corner connectors shown in FIG. 1, attaching a central panel to a pair of rail members, whose intersecting axes form an angle of is less than 90°;

FIG. 3 is an exploded, perspective view of one corner connector showing the interior of the connector and shells before the shells have been secured together;

FIG. 4 is a cross-sectional view, in a vertical plane, illustrating internal features of the assembled corner connector shown in FIG. 2;

FIG. 5 is a cross-sectional view of the corner connector shells shown in FIG. 3, as they would be assembled, but with the rail members and the panel member omitted, for purposes of clarity;

FIG. 6 is a perspective view of the corner connector of FIGS. 2 and 4 showing the two shells, or sections, of the corner connector being clamped together, by the jaws of pliers, to effect their assemblage;

FIG. 7 is a perspective view of a second piece of children's furniture, namely a combination child's bookcase and toy chest;

FIG. 8 is an exploded, perspective view of an intermediate, corner connector, illustrated in the construction shown in FIG. 7;

FIG. 9 is an exploded, perspective view of one of the floor engaging, bottom corner connectors illustrated in FIG. 7, showing the interior of the connector and shells, before the shells have been clamped together; and FIG. 10 is a cross-sectional view, in a vertical plane, of a bottom corner connector of the type used in the construction illustrated in FIG. 7.

DETAILED DESCRIPTION OF THE INVENTION

FIG. 1 shows a child's desk, generally indicated at 10. The desk component 12 is an inclined element supported by a front desk leg generally indicated at 14. The means of connection of desk component 12 to the upper end of front desk leg 14 may be any means of connection as it is not part of the invention disclosed herein. The lower portion of the front desk leg support 14 is made up of three, channel-shaped or grooved, elongated frame, or rail, members 16, 18 and 20, pairs of which are attached to each other through floor-engaging corner connectors 22 and 24. The three frame members receive, in the channel grooves thereof, a planar panel 26, which preferably is attractively decorated and is made of inexpensive sheet material, such as a heavy cardboard or chip board.

The planar panel 26 is centrally attached, by any appropriate means, such as screws, or other means of attachment, to the front edge of an elongated, planar brace 28. The brace 28 is located in a substantially vertical plane and may, for example, be cut with an arcuate leg cutout 29 from a sheet of wood. A forward portion 28' of planar brace 28 may be secured in any manner to the underside of the desk component 12. A rear portion 28" of brace 28 is attached to a rear upright support panel 30 and to the underside of a molded or formed seat.

The rear panel 30 is also framed by three channel-shaped, or grooved, elongated rail members 32, 34, 36 attached to each other through floor-engaging corner connectors 38 and 40. The rear support panel 30, its associated channel-shaped frame members 32, 34 and 36 and the two rear corner connectors 38 and 40 form a rear support leg generally indicated at 42, which together with rear portion 28", of brace 28 supports the seat component 44 of the desk 10. The heads 43 of three fastener elements, such as screws or pins, provide connectors to brace portion 28" and upright support rails of rear support panel 30. The forwardmost connector 43 passes through the seat and secures into an edge of planar brace 28. The two rearmost connectors 43 pass through the seat for connection into the ends of upright support rails 32 and 36.

FIG. 2 shows in enlarged detail, one of the desk leg's corner connectors 22. Connector 22 is formed of a pair of shell-like parts which are shaped and arranged so that when they are assembled, a pair of sockets will be formed. The sockets are constructed and arranged to receive and hold the ends of a pair of transverse frame members, such as an upright rail 16 and a horizontal rail 18. The other connector 24 of the front desk leg support 14 is a mirror image of connector 22 and is formed to provide a pair of sockets constructed and arranged to receive thereinto the second end of horizontal rail, 18 and the lower end of upright rail 20. Preferably the cross section of rails 16, 18 and 20 is rectangular with an inner rectangular cutout. The cutout is illustrated as groove 48 on rail 16, groove 52 on rail 18, and an unnumbered groove on rail 20 which has a mirror image of groove 48 on rail 16. The panel 26 is formed with edges or tongues 46 and 50 that are inserted snugly into the grooves 48 and 52 of rails 16 and 18, and into the groove of rail 20.

Each corner connector 22 is made up of two complementary, molded identical parts, so that a corner connector 22 includes an outer shell 56 and an inner shell 54. The corner connector 24 is of the same construction as corner connector 22. The shells 54 and 56 are shaped, dimensioned, and constructed to fasten around the lower end of upright rail 16 or 20, and one end of horizontal rail 18. The panel 26 is of a thickness to fit between the edges of a slot 58 that is formed when each set of two shells 54 and 56 of corner connectors 22 and 24 is fastened together.

The external surface of assembled corner connector 22 provides an exterior bottom support surface 60, best seen in FIGS. 2 and 5 which merges with rounded corner 62. The bottom surface 60 with its rounded corner 62 provides for easy movement of the desk 10 along a floor without scratching the floor. The support surface 60 also operates to space the bottom rail 18 from the floor. The support surface 60 provide, a floor contact that is different than that which a rail 18 would ordinarily make. That is, the support edge 60 provides a floor-engaging support located in a plane spaced intermediate the frame assemblage and the floor surface. The rounded, arcuate, corner surface 62 also provides for movement along the floor without snagging with a floor covering.

FIG. 3 shows the details of the interior construction and interconnection means of the pair of shells 54 and 56. Shell 54 is molded to provide, integral therewith, a pair of solid, tapered pins 64 and 66. Tapered pin 64 is so located, and is selected of a size to telescope with a press fit, into an elongated tubular sleeve 68 provided on shell 56 to develop a frictional securement therebetween. Similarly, tapered pin 66 is located to telescope with a press fit, into an elongated, tubular sleeve 70 provided on shell 56. The sleeves 68 and 70 are integrally provided on shell 56. Shell 56 also has a pair of tapered pins 72 and 74 positioned to be inserted with a press fit, respectively into tubular sleeves 76 and 78 that are provided on shell 54.

A stud segment 80 is provided on shell 54. A second stud segment 82 is provided on shell 56. When the shells are secured to each other by the tapered pins 64, 66 and 72, 74 entering their respective tubular sleeves, the complementary stud segments 80 and 82 will be axially aligned to form sections of an elongated stud. The stud will extend into an aperture 120, seen in FIG. 4, that is provided through panel 26. The panel 26 will thereby be engaged to the two adjacent ends of stud segments 80 and 82 which are each respectively part of the two shell segments 54 and 56.

The end of front upright rail 16 is to be held within a rectangular receptor socket defined by the assembled plastic shells 54 and 56. A receptor socket segment 84, provided by the shape of shell 54, along with a similar receptor socket segment 86, provided by the shape of shell 56, will together form the rectangular receptor socket for receiving a terminal end of rail member 16 when shells 54 and 56 are clamped together. The receptor socket segment 84 is bounded by a set of ribs 92 and 94, while ribs 96 and 98 bound the receptor socket segment 86. Similarly, receptor socket segment 88 is bounded by ribs 100 and 102, and receptor socket segment 90 is defined by ribs 104 and 106. All four receptor segments 84, 86, 88, 90 are also respectively provided with an intermediate rib 108, 110, 112, 114, located between the two boundary ribs. When the shells are gripped together, the ribs serve to support and align the rail members within the receptor sockets and to reinforce the walls of the shells. Each shell 54, 56 is also provided with an angle-shaped, corner, reinforcement wall means 116, 118, in the corner 62.

FIG. 4 shows a cross-sectional view of the assembly shown in FIG. 2, taken substantially at line 4—4. The panel 26 is held at its edges 46 and 50 within the grooves 48 and 52 provided on the frame members 16 and 18. The shell 54 grips the rail members 16 and 18 and aligns the panel 26. Ribs 92, 94 and 108 support and center rail 16 within socket segment 84. Ribs 100, 102 and 112 support and center rail 18 within socket 88.

The frictional interconnection means by which shell 56 is held to shell 54 is also shown. Sleeve 70 of shell 56 telescopically receives tapered pin 66 of shell 54. Tapered pin 72 of shell 56 telescopes into and is engaged with sleeve 76 of shell 54. Similarly, tapered pin 64 of shell 54 is telescoped into sleeve 68 of shell 56, and tapered pin 74 of shell 56 is telescoped into and engages with sleeve 78 of shell 54.

The size of the terminal end of rail member 16 is selected so that when the rail member is properly received in a receptor socket, defined by assembled segments 84 and 86, a portion of the longitudinal edge of rail 16 will abut the stud 80 and 82, and a portion of the transverse edge, or terminus face, of rail 16 will abut against the sleeve 70, limiting the projection of the frame member into the corner connector 22. A portion of the longitudinal edge of the terminal end of horizontal rail 18, when received within a receptor socket formed by socket segments 88 and 90, will similarly abut the completed stud 80 and 82, and a portion of the transverse edge of said rail 18 will abut the tubular sleeve 78.

The alignment stud segment 80 of shell 54 projects through a portion of the aperture 120 provided on panel 26. In conjunction and alignment with stud segment 82 of shell 56, the stud segment 80 will hold the panel within slot 58, defined by spaced edges of shell segments 54 and 56, and best seen in FIG. 2.

The terminal ends of the rails 16 and 18 will be held within the assembled connectors 22 and 24, through the joint interaction of the alignment pins, and sleeves for receiving the pins, the abutment studs 80 and 82, and the rail member channels 52 and 48. The alignment stud segments 80 and 82 of the plastic corner segments will fasten the panel 26 within the corner connectors 22 and 24. The rails 16, 18 and 20 hold panel 26 within channels 48 and 52 (seen in FIG. 2). The ends of rails 16, 18 and 20 are held within receptor sockets provided on corner connectors 22 and 24. The rails 16, 18 and 20 are prevented from axial movement along their longitudinal axes by the engagement of an edge of rails 16, 18 and 20 with abutment studs 80 and 82, and by the engagement of an end of rails 16, 18 and 20 with tubular stems 78. Thus, the panel 26, rails 16, 18 and 20 and corner connectors are fastened to each other through the alignment pins/abutment studs and the insertion of the panel 26 within the rail channels 48 and 52.

FIG. 5 shows a cross-sectional view of connector 22, taken when shells 54 and 56, of FIG. 3, are assembled. Solid pin 66 of shell 54 has been telescoped into sleeve 70 of shell 56. Pin 72 of shell 56 has been telescoped into sleeve 76 of shell 54. Rib 92 of shell 54 is aligned with rib 96 of shell 56. A ridge 122 is formed which extends around the circumference of the receptor socket 124 that is formed when the shells are fastened together. Ribs 94 and 98 are aligned to form a circumferential ridge 126. Rib 108 is aligned with rib 110. Reinforcement ribs 116 and 118 are aligned to provide a single reinforcement rib. The bottom surface 60 of the connector 22 is shown in FIG. 5. Its thickness causes the floor surface to be located outwardly of the rails, such that the desk 10 will rest on the corner connectors and not on the frame. The corner connectors thus serve as a mediant between the floor surface and the rail member 18.

FIG. 6 shows shell 54 being connected to shell 56. After the panel 26 is inserted within the channels 48 and 52 of rails 16 and 18, the shells 54 and 56 are to be secured to each other around the assembly. The pins 66, 72, 64 and 74 will respectively be telescoped into a frictional holding cooperation with sleeves 70, 76, 68 and 78. The stud segments 80 and 82 will be aligned with each other and will project into and engage the aperture 120 provided on the panel 26.

Slot 58 allows panel 26 to be received within the connector 22 between the segments 54 and 56 thereof. The rails 16 and 18 will be held within the receptor sockets formed by the cooperating receptor segments 84 and 86, for receiving rail member 16, and 88 and 90, for receiving rail member 18. A cloth 128 or other protective material may be placed around the shells 54 and 56 so that the outside surface of connector 22 remains unscratched when the pliers 130 or other clamping tool is used. The pliers 130 or other clamping tool is then applied to clamp the shells 54 and 56 together, thereby holding the rails 16 and 18 to each other and to the panel 26.

FIGS. 7-10 show another piece of furniture, a child's bookcase and toy chest 132, assembled with planar panels inserted within rail members, and fastened with the novel connectors of the type described above. Side panel 134 has been inserted within the channels provided on rails 136, 138, 140, 142, 144 and 146. Each of corner connectors 148, 150, 152, 154, 156 and 158 captures two of the rails and fastens the panel 134 to them. Thus, connector 148 captures the ends of rails 136 and 146; connector 150 captures the ends of rails 136 and 138, etc. Similarly, side panel 160 has been inserted within the channels provided on rails 162, 164, 166, 168 and hidden rails corresponding with rails 136 and 146, but not seen in FIG. 7. Each of corner connectors 170, 172, 174, 176 and 178 captures two rails and fastens panel 160 to them.

A front panel 180 is inserted within channels, or grooves, that are provided on the pair of rails 182 and 184. Each of corner connectors 150, 152, 176 and 178 is provided with an alignment hole (seen at 318 in FIG. 9), through which an end screw is to be put, in order to screw into and fasten one terminal end of each of the rails 182 and 184 to the respective corner connectors. Similarly, edges of rear panel 186 are received within channels provided on rear rail members (e.g. rail 188), which also are attached with end screws to alignment holes provided on corner connectors 158, 170 and 148 and an unseen connector located at the right, bottom, rear corner of the assemblage. A lower bookshelf 190 is supported by rail 192, that is similarly attached at its ends with end screws, to alignment holes provided on corner connectors 154 and 174. Upper shelves 194 and 198 are inserted between and secured to upper sections of side panels 134 and 160. The ends of said upper shelves are secured to side panels 134 and 160 by screws that project through the side panels 134 and 160 and screw into the ends of rail members 196 and 200 which connect to the lower front edge of the associated shelves. Sliding doors 202 and 204 are inserted within grooves provided on rails 184 and 192.

FIG. 8 is an exploded view of a 225° included angle connector assembly 152, of FIG. 7, fastening panels 134 and 180 to rails 138, 140 and 184. Edge 206 of panel 134 is inserted in channel 208. Edge 210 is inserted in the channel provided on rail 140. Shell 212 is attached to the assembly so that the sleeve 214 will extend through aperture 215. Inclined rail 140 will be held within receptor socket segment 216. The sleeve on shell 230 into which solid pin 218 telescopes (not shown), will extend through aperture 219. Rail 138 will be held within receptor socket segment 220. Alignment hole 222 will line up with aperture 224 of panel 134. Screw 226 will align the panel and rails, 134, 138 and 140 with the shell 212, and will fasten rail 184 to the assembly. Screw 226 will slide through the aperture 224 of panel 134 and through the alignment hole 222 of shell 212, and screw into bore 228 of rail 184. Shell 230 is then clamped to shell 212.

Solid pins carried adjacent the top end of shell 230, but not seen in FIG. 8, telescope into sleeves 214 and 232 of shell 212. Pin 234 on shell 212 telescopes into a sleeve 236 on shell 230. Pin 238 telescopes into a bottom sleeve 240 on shell 230. Pin 218 telescopes into the other bottom sleeve (not shown) of shell 230.

Receptor socket segment 242 will adjoin socket segment 216 on shell 212 to form a receptor socket for holding rail 140. The lower edge of rail 140 will abut the sleeves 214 and 232 provided adjacent the upper end of shell 212. Rib 244 on shell 230 and rib 246 on shell 212 will align and support rail 140. Likewise, receptor socket segments 220 and 248 will form a receptor socket for holding rail 138, and ribbing on said socket segments will provide alignment of said rail. The upper edge of rail 138 will abut the sleeve means 240 only one of which is shown, provided adjacent the bottom of shell 230.

Front panel 180 of FIG. 7 will be received in both channel 250 of rail 184 and slot 252 provided on shell 212. Sliding door panels 202 and 204 will each be received in separate channels 254 and 256 of rail 184.

FIG. 9 shows a 90° included angle corner connector 148 of FIG. 7, before it is fastened together. Shell 258 has solid pins 260 and 262 to be telescoped and press fit into tubular sleeves 264 and 266 of shell 268. Pins 270 and 272 of shell 268 are to be press fit into tubular sleeves 274 and 276 of shell 258. Vertical receptor socket segments 278 and 280 combine to form a receptor socket for holding a vertical rail such as member 146. Ribs 282 and 284 on shell 268 will align with ribs 286 and 288 on shell 258 and ribs 290 and 292 will also align. The ribs will align to hold the vertical rail 146 within the socket formed by segments 278 and 280. Inverted, T-shaped abutments 294 and 296 will limit the projection of the rail 146 into the connector 148.

Horizontal, receptor socket segments 298 and 300 on shells 268 and 258, combine to form a receptor socket for holding a horizontal rail such as member 136, shown in FIG. 7. Ribs 302 and 304 of shell 268 will align with ribs 306 and 308 of shell 258 and ribs 310 and 312 will also align. Inverted, T-shaped abutments 314 and 316 will limit the extent to which the rail 136 enters the horizontal socket of connector 148. An alignment sleeve 318 that is split along its diameter will line up with a bore provided in a cross bar rail, not shown, but opposite rail 182 in FIG. 7, and a screw will be received through the alignment sleeve 318 and screwed into the bore of said rail. Cutouts or openings 320 and 322 on sleeve 318 each provide for sliding accommodation of a corner of the rails 136 and 146 into the connector formed by shells 258 and 268, without interference with the sleeve itself. Alignment stud segment 324 will enter an aperture in a panel such as panel 134, shown in FIG. 7, in order to align and to fasten the panel to the assembly. Slot 326 will receive another panel extending transverse to the panel 134 such as rear panel 186, shown in FIG. 7. Reinforcement angle rib 328 in one corner of shell 268 provides support to the alignment sleeve 318. Corner ribs 330 and 332 provide reinforcement to the bottom surface of the connector segments 268 and 258, upon which the bookcase/toy chest rests.

FIG. 10 shows a cross-sectional view of a connector, such as connector 148, shown in FIG. 7. The view is from the inside of the bookcase/toy chest. Edge 334 of panel 134 is inserted in groove 336 of rail 146 and edge 338 is inserted in groove 340 of rail 136. The shell 258 grips the rails 146 and 136 and aligns the panel 134. Ribs 286, 288 and 292 support rail 146 within socket 280 and provide reinforcement of the shell. Ribs 306, 308 and 312 support rail 136 within socket 300 and provide reinforcement of the shell. The extent to which rail 146 enters socket 280 is limited by abutment 296. Similarly, the extent to which rail 136 enters socket 300 is limited by abutment 316.

Shell 258 is frictionally interconnected with shell 268 to form fastener 148. The interconnection means between the shells consists of pins 270 and 272 of shell 268 frictionally telescoping into sleeves 274 and 276 of shell 258; and sleeves 264 and 266 of shell 268 receiving in a telescoping, friction fit pins 260 and 262 of shell 258. Shell 258 will hold and align panel 134 when alignment stud 324 extends through an alignment aperture 342 that is provided on and through panel 134. The panel will be held within a slot 344, created when shell 268 is fastened to shell 258.

While particular embodiments of this invention have been shown and described, it will be obvious to those skilled in the art that various changes and modifications may be made therein without departing from the spirit and scope of the invention. Therefore, it is intended in the appended claims to cover all such changes and modifications which fall within the true spirit and scope of the invention.

What is claimed is:

1. A furniture piece for children wherein the furniture piece includes panels of inexpensive sheet material and rail means operatively associated with said panels; the furniture piece including, in combination:

a plurality of rails each with a longitudinal groove formed therein adapted for receiving thereinto an edge of one of said sheet material panels;

corner connecter shell pairs each formed in a shell-like configuration for defining, when assembled, a pair of transverse sockets, each adapted to receive therein one rail end for holding therein an end of a rail;

the shell-like configuration of each corner connector including a first molded shell with elongated pins and tubes extending transversely of the shell toward the cooperating shell, the other shell of the connector shell pairs also having elongated pins and tubes of a size and shape and position to receive, in cooperating manner, the pins and tubes of the first molded shell in a manner to hold the corner connector shell pairs frictionally assembled when pressed together; and the shell-like configuration of the corner shell pairs also including at least one stud on one shell adapted to extend toward the other shell and into an opening provided in the panel, so as to hold and position the panel relative to the corner shell pairs and to the plurality of rails.

2. A construction as in claim 1 wherein the corner connector shell pairs provide a plurality of opposed ribs bounding each transverse socket for holding and aligning a rail relative to the transverse socket into which a rail is received.

3. A construction as in claim 1 wherein portions of each stud and of one of said tubes are positioned to provide a planar abutment stop for an end of a rail that is inserted into a socket for receiving the rail's end.

4. A construction as in claim 1 wherein means on each shell provide a planar stop for being abutted by an end of a rail that is to be inserted into a socket that is provided for receiving the rail's end.

5. A construction as in claim 1 wherein the exterior of the shell pairs are shaped to provide a mediant surface that is provided between each assembled shell pairs and a support surface for the furniture piece.

6. A construction as in claim 1 wherein at least one of the corner connector shell pairs are constructed to have three rails connect thereto, two of said three rails being received in sockets formed by the corner connector shell pairs, and the third rail being connected to one shell of a shell pair by an end screw that is supported on one of the pair of shells and that is of a length to screw into a terminal end of the third rail.

* * * * *